United States Patent [19]
Dibner

[11] 3,989,900
[45] Nov. 2, 1976

[54] AUTOMATIC TELEPHONE ALARM SYSTEM

[75] Inventor: Andrew S. Dibner, Newton, Mass.

[73] Assignee: Lifeline Systems, Inc., Newton Centre, Mass.

[22] Filed: Nov. 4, 1974

[21] Appl. No.: 520,495

Related U.S. Application Data

[63] Continuation-in-part of Ser. No. 394,792, Sept. 6, 1973, abandoned.

[52] U.S. Cl................................. 179/5 P; 179/5 R
[51] Int. Cl.[2]........................................ H04M 11/04
[58] Field of Search........... 179/5 P, 2 A, 5 R, 2 TC

[56] References Cited
UNITED STATES PATENTS

| | | | |
|---|---|---|---|
| 2,609,045 | 9/1952 | Kaiser | 58/152 T |
| 3,294,910 | 12/1966 | Jackson | 179/2 TC |
| 3,512,355 | 5/1970 | Lang | 58/152 T |
| 3,662,111 | 5/1972 | Rubinstein | 179/5 P |

*Primary Examiner*—David L. Stewart
*Attorney, Agent, or Firm*—Harness, Dickey & Pierce

[57] ABSTRACT

An alarm system for automatically sending a telephone message or other remote signal in case help is needed for a person residing alone. In one version, a timer cyclically activates a magnetic tape player which begins slowly to dial the number of the station at which help is available, and then transmit a prerecorded message. The timer simultaneously activates an audible warning signal so that the resident can abort sending of the message if no help is needed. The timer is automatically reset each time the resident lifts the handset in normal telephone usage so that it is unnecessary under ordinary circumstances for him to worry about resetting the timer each day. Should the audible signal be activated but there is no need for help, the signal may be shut off, the message sending aborted and the timer reset merely by lifting the handset. A manual emergency bypass switch is provided. A second embodiment substitutes a high speed digital dialer and transmitter for the tape player, the dialer being activated after a short delay during which the audible signal is sounding. Additional modifications show the automatic telephone alarm system adapted to multiple dwelling use or to existing emergency alarm systems.

1 Claim, 6 Drawing Figures

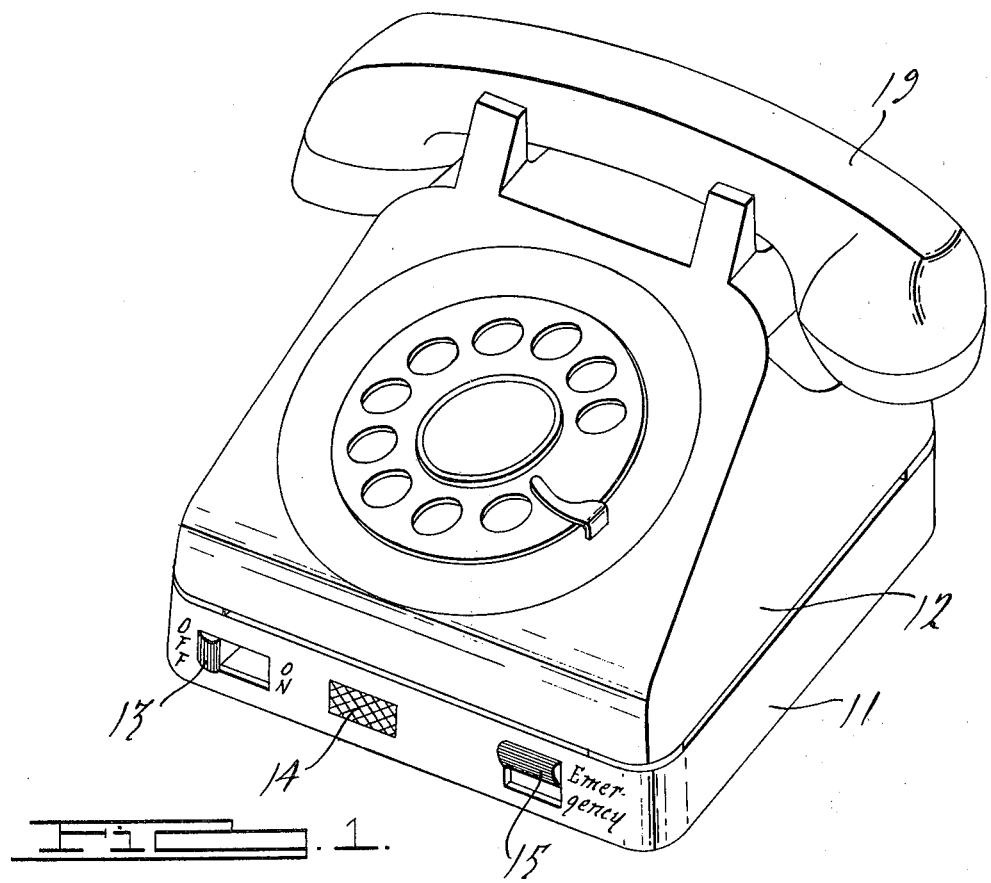
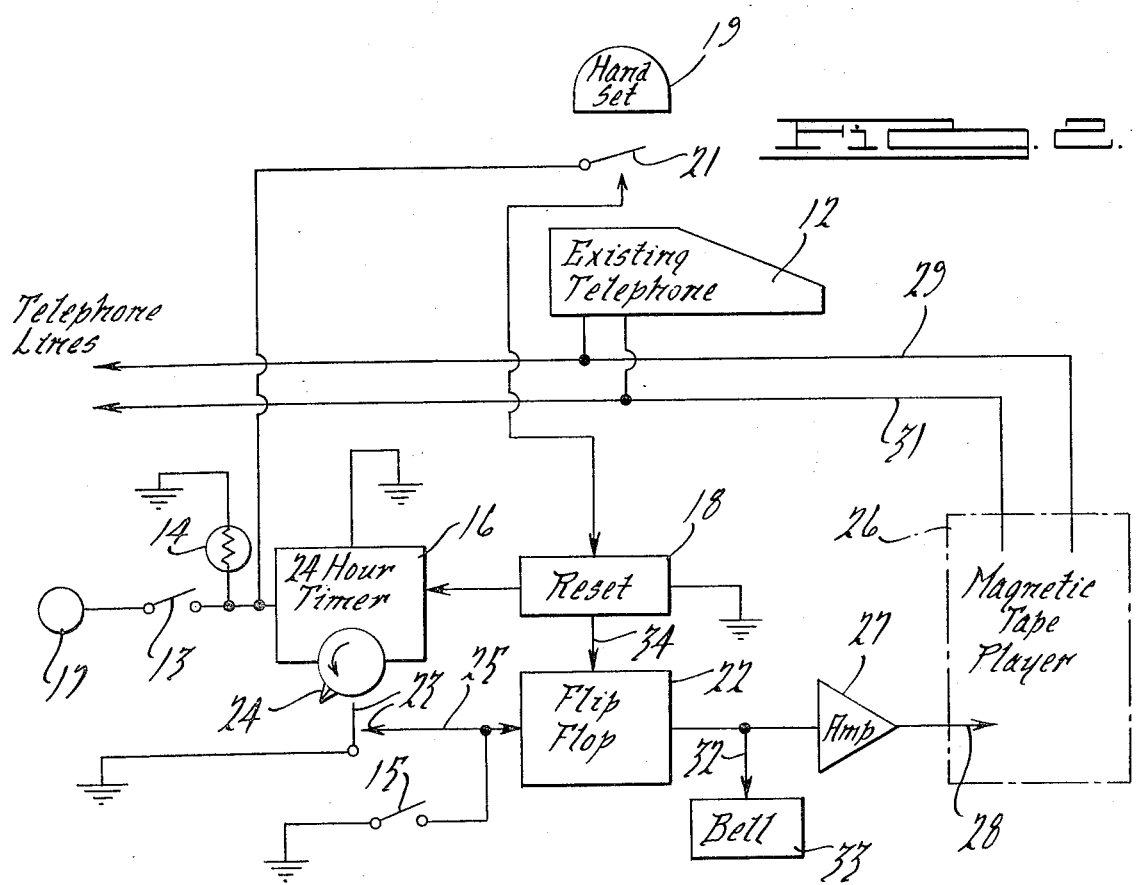

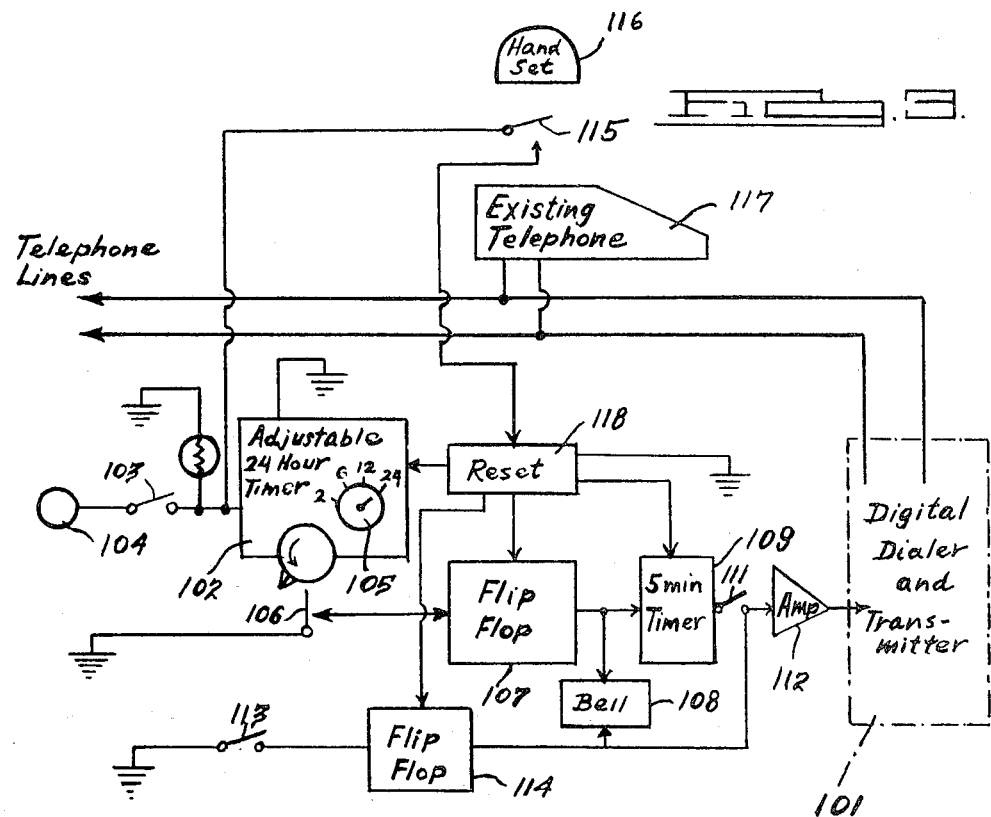

AUTOMATIC TELEPHONE ALARM SYSTEM

This application is a continuation-in-part of my copending application Ser. No. 394,792, filed Sept. 6, 1973, and now abandoned.

BACKGROUND OF THE INVENTION

1. Field of the Invention

This invention relates to an automatic telephone alarm system which, in the absence of certain signs of daily activity of the owner, namely his use of the telephone, will continuously dial prerecorded numbers and give messages of the emergency, or will initiate other types of alarms.

2. Description of the Prior Art

Many old or infirm people who live alone fear their becoming incapacitated, being unable to summon help, and perhaps expiring or suffering irremediable damage because they may not be found for days. There have been many efforts to arrange for periodic checks on isolated infirm persons by individuals or agencies to see if they are all right, but these checks are costly in terms of time and effort, and may be unreliable. Warning devices have also been developed to automatically call for help by telephone or other means if persons become stricken, but these have mostly involved positive actuating mechanisms which, of course, a severely incapacitated person might not be able to effectuate.

One patented alarm device (Rubinstein U.S. Pat. No. 3,662,111) is actuated by default of the owner. It generates low level alarms at predetermined time intervals which, if not reacted to by the owner, lead to a dialing and message alarm sequence. However, the periodic low level alarms, with requirement for action by the owner each time, could prove to be an annoyance to some persons. The owner must be present at each predetermined time each day, which is not an appropriate expectation for old but still active persons. Also, if the owner is sleeping, the predetermined alarms would wake him.

An alarm system developed in Sweden and referred to as "The Watchman" "Emergency Warning Aid (EWA)" utilizes a control unit connected to frequently used electric switches such as the bathroom or refrigerator light, the stove, or a bedside lamp. When the switch it turned on, an impulse is transmitted to the unit, setting a timer to zero. If the timer is not reset within a predetermined time, an alarm is transmitted. A disadvantage of this system is that the activity sensors are widely scattered throughout the abode and are separate and apart from the single most likely instrument for obtaining help — the telephone. The installation of such a complicated system in different parts of a dwelling could be quite expensive.

There is need for a unitary device which is responsive to the possible incapacity of the owner, but also is responsive to this capable, usual daily functioning, and during such periods of capable functioning would remain a silent and unobtrusive guardian. If the device is to be of practical value it should be as simple and inexpensive as possible, to make it available to the elderly or disabled groups who need it. The device should be integrated with the household telephone which is habitually used on a daily basis by persons living alone and is thought of as the single most likely location in a dwelling where one can call for emergency assistance.

BRIEF SUMMARY OF THE INVENTION

It is an object of the present invention to provide an automatic telephone warning system which takes into account the owner's healthy or capable state by being responsive to his use of his telephone. If the owner shows his healthy capability through daily use of the telephone the present invention would keep a silent vigil; but in the event that the telephone is not used for 24 hours, or for a selected shorter time, possibly indicating an incapability of the owner, the device automatically sounds an alarm, or in some versions calls a prerecorded number or numbers giving emergency messages. The device, however, in most illustrated versions, also provided for a warning signal to the owner indicating the imminent sending of the alarm so that he may forestall its completion. These versions of the device also provide means for manually sending the alarm at any time if the owner feels an emergency exists. The device is simple in design and would be relatively inexpensive to buy.

As illustrated in one version, the telephone alarm system has a 24 hour timer which is reset to zero each time the telephone handset is lifted. In the event the telephone has not been in use for 24 hours, the device will dial one or more prerecorded telephone numbers, and deliver to each a warning message. Simultaneously, the device will cause a continuous ringing of a bell as a local alarm, providing the information that the warning dialing has begun or is about to begin. Means are also provided for manually activating the automatic dialing and warning procedures.

In another embodiment, a plurality of telephone alarm systems are installed in a multiple dwelling, with the timers and reset means, as well as audible and visual alarms, being located in a central area. In still another version, the telephone alarm system in a dwelling comprises the timer and telephone-responsive reset means connected to an already existing alarm system. The latter two embodiments of the invention are illustrated as utilizing alarm means other than a telephoned message.

BRIEF DESCRIPTION OF THE DRAWINGS

FIG. 1 is a perspective view of a typical home telephone with the alarm system incorporated therewith.

FIG. 2 is a schematic block diagram of the system.

FIG. 3 is a schematic diagram of a modified form of the invention in which a high speed digital dialer and transmitter takes the place of the tape player, its operation being delayed by an additional timer so that the alarm may be aborted.

DESCRIPTION OF THE PREFERRED EMBODIMENTS

Figure 4:
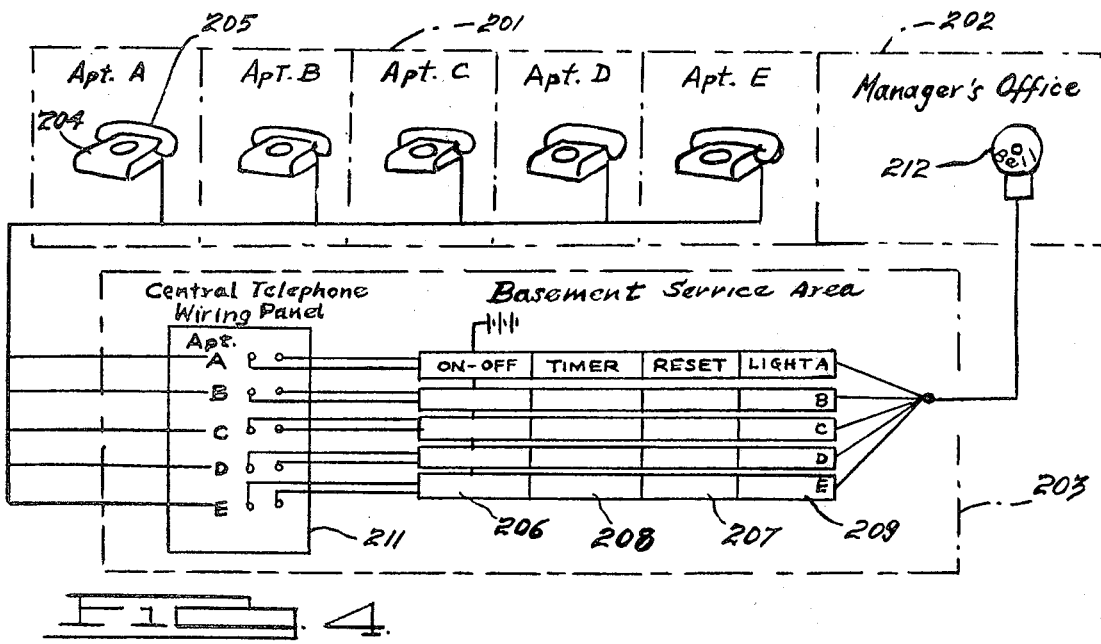
FIG. 4 is a schematic diagram of another form of the invention in which the alarm system is installed in a multiple dwelling with the alarms being in the form of visual and audible signals at a central location.

Referring to FIG. 1, the system comprises a thin, flat tray 11 upon which sits the telephone 12 to which it is connected. Visible at the front is a switch 13 which activates the device, green light 14 which shows when it is activated, and manual emergency switch 15 whose function is later described. The embodiment of the device need not take the form shown, but may take various other configurations to accommodate the type of telephone to which it is to be connected, and/or the bulk of the specific means incorporated in the device.

The remainder of the system may perhaps best be described with respect to its operation.

Referring to FIG. 2, closing switch 13 activates the system by connecting a 24 hour timer 16 to a power supply 17. At the same time green light 14 is lit to show that the system is activated. Timer 16 is reset to zero by a reset switch means 18 at any time that the telephone handset 19 is lifted, as in answering a call, making a call, or merely lifting and dropping the handset. This may occur from none to many times during the day depending on the telephone usage of the owner. Reset switch means 18 is activated by a switch 21 which is attached to the telephone housing and responsive to lifting of the handset. For example, opening of switch 21 when the handset if lifted could actuate a relay in reset switch means 18 which actuates means for driving timer 16 to its zero position. The timer will immediately begin to run again from that position as long as switch 13 is closed.

Reset switch means 18 also resets a flip-flop 22 as will be described later. It should be apparent that there might be any number of means, either mechanical or electronic to substitute for switch 21 to make resetting timer 16 responsive to use of the telephone.

Should there be no telephone usage for a period of 24 hours, the alarm condition will commence. Timer 16 will close a switch 23 by means of a cam 24, causing a pulse on line 25. This pulse causes flip-flop switch 22 to close, activating a magnetic tape player 26, here shown as a "black box", through an amplifier 27 and a power supply conductor 28. The tape player transmits to telephone lines 29 and 31 pre-recorded tone patterns to create an "off hook" condition followed by "dialing" of a number, followed by a prerecorded message that help is needed at the address of the owner. There follows by further prerecorded tone patterns creation of an "on hook" condition, then repetition of the off hook condition, dialing and message to a second number, a third, etc. Through use of an endless tape, the dialing is continuous until either the phone handset 19 is lifted or switch 13 is opened.

At the same time the tape player is activated, a pulse is generated in line 32 to activate an audible alarm such as bell means 33. This would cause a continuous ringing which would serve two purposes: It would indicate that the alarm sequence is in effect and help will be forthcoming; on the other hand, if it is a false alarm caused only by lack of use of the telephone, and not by incapacity of the owner, it would alert the owner to abort the alarm condition by lifting the handset. This action would shift switch 21, causing reset of flip-flop 22 through activation of reset switch means 18, further causing discontinuance of power to tape player 26 and deactivation of bell means 33, as well as resetting of timer 16. For example, a relay switch in reset means 18 could send a pulse through a line 34 leading to flip-flop 22, shifting the flip-flop back to its initial condition. To give the owner sufficient time to abort the alarm, the dialing tone pattern of the numbers to be called should be prerecorded in a manner taking a relatively long time, said 90 seconds or longer, which is the equivalent in time to 15 rings of a conventional telephone.

Manual activation of the alarm condition is also possible through activating swtich 15 which would set flip-flop 22, activating tape player 26 and bell 33. This would be useful when the owner felt an emergency existed and was able to reach and depress switch 15.

Once connected to the telephone and a power source, and switch 13 closed, the alarm system becomes a silent guardian, because no alarms are given provided that the telephone is used, or at least the handset 19 lifted, once a day. This action indicates the continued capability of the owner. However, should a 24-hour period pass without the owner lifting the phone, the alarm condition begins. If it is a false alarm, the owner has approximately 90 seconds to abort the emergency dialing and messages. If he does not do so by lifting the handset, one or several numbers will be continuously dialed and emergency messages given. In the meantime bell 33 will ring continuously.

The advantages of this device lie in its relatively simple and therefore inexpensive design, and the fact that in normal usage it would be an unobtrusive protector, resetting itself automatically to the degree of activity of the owner vis-a-vis usage of his telephone. The relatively low cost of the device will make it available to a large number of the aged and infirm who need such a service and yet have limited income.

If the owner is to be absent from his home for a number of hours he need only lift and drop the handset before leaving to reset 24-hour timer 16 to zero. If he plans to be away for more than 24 hours he can deactivate the device by opening switch 13, reactivating it when he returns. He can also test the device's alarm capability by activating switch 15 and when the alarm sounds he can abort the dialing by lifting the handset.

The device would not interfere with normal use of the telephone. There is also little likelihood of a false alarm occurring in the middle of the night unless the last telephone use occurred 24 hours earlier in the middle of the night. This can be avoided by lifting and dropping handset 19 the next day.

FIG. 3 illustrates another embodiment of the invention similar to that of FIGS. 1 and 2, but in which a high speed digital dialer and transmitter 101 is substituted for the magnetic tape player. A continuously running adjustable 24 hour timer 102 is activated by switch 103 from a power supply 104 and will initiate operation of dialer 101 at predetermined intervals. As shown, the length of these intervals may be preselected by a dial 105, four selections being shown, for 2 hours, 6 hours, 12 hours and 24 hours. The availability of shorter time periods could be valuable in some instances. For example, a paraplegic or quadraplegic patient who normally has costly 24 hour a day personal attendants could have the timer set for 12 hours so as to monitor his waking and sleeping times, thus eliminating the night attendant. Similarly, the timer could be adjusted for other degrees of incapacity.

Timer 102 controls a pulse-creating switch 106 which is connected to a flip-flop 107. The flip-flop is in turn connected to an audible warning alarm 108 in the dwelling and a second timer 109. This timer controls a switch 111 which is connected to dialer 101 through an amplifier 112.

A manual emergency switch 113 is also provided, connected to a flip-flop switch 114 which in turn is connected directly to audible signal 108 and amplifier 112, by-passing flip-flop 107, timer 109 and switch 11.

As in the previous embodiment, the means for resetting timer 102 comprises a switch 115 which is responsive to an "off-hook" condition of the telephone line caused by lifting of telephone handset 116 on the existing telephone 117. Switch 115 is actuated by answering a call, making a call, or merely lifting and dropping the handset and is connected to a reset switch means 118. The latter is connected to timers 102 and 109 as well as flip-flops 107 and 114, and incorporates means for causing the timers to be reset to zero and the flip-flops shifted to their initial condition.

In operation of embodiment of FIG. 3, dial 105 of timer 102 will be preset to the appropriate time and switch 103 closed. This will start the timer running. If handset 116 is lifted at any time before timer 102 runs out, the timer will be reset. If the timer runs out, switch 106 will send a pulse to flip-flop switch 107, causing audible signal 108 to sound and starting timer 109. The latter may be set, for example, for 5 minutes, during which time the resident can abort the alarm by lifting handset 116. If he does not, switch 111 will close to initiate the dialing and transmission by unit 101. This unit, as well as central station receiving equipment to which it may be connected, is in itself known. Examples are transmitter Model T-4 and receiving Model R-4 maufactured by Currier-Smith Corporation, Bedford, Mass. Such equipment is capable of seizing and relinquishing telephone lines and repeatedly redialing unitl a receiving signal is received from the central station, indicating that the call has gone through. The transmitter could then send an identification signal. If desired, other triggers for this transmitter 101 could be installed in the dwelling, such as burglar or fire sensors, although these do not form part of the present invention. In such event, the transmitter would also send an indication of the alarm condition. If a central station is used, the operator would initiate appropriate emergency procedures and send a signal to transmitter 101 which would shut down the alarm and dialing conditions.

Figure 5:
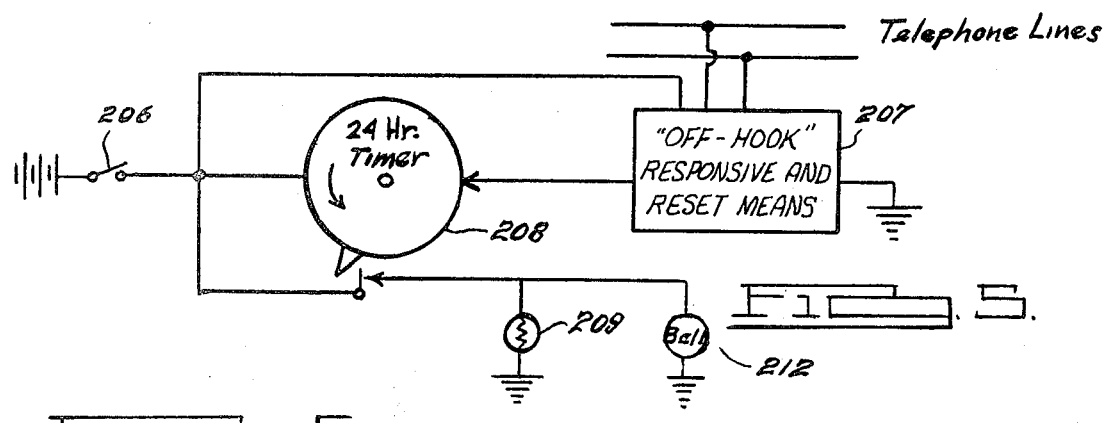
FIG. 5 is a schematic diagram of a single alarm unit at the central location in the FIG. 4 system.

FIGS. 4 and 5 show another embodiment of the invention which is usable in a multiple dwelling 201 having units labeled "Apt. A," "Apt. B," etc., a manager's office 202, and a basement service area 203. In such a system each existing telephone 204 having a handset 205 would have a corresponding on-off switch 206, "off-hook" responsive and reset switch means 207, timer 208 and visual alarm signal 209 in the central service area. The telephones would be connected to these components of the system through a central telephone wiring panel 211. If desired, a single audible alarm signal 212 located in the manager's office could be connected to all the timers 208. It is contemplated that this system would omit the audible advance warning signal described with respect to the previous embodiments since the manager is on the premises and could easily check any apartment upon receiving the alarm. The emergency by-pass switch could also be omitted, many apartment houses for elderly people being already provided with emergency alarms.

In operation of the system of FIGS. 4 and 5, each timer 208 will continually monitor the apartment to which it is connected. As long as the resident of that apartment uses his telephone or lifts the handset within the set time interval, no alarm will sound. However, running out of timer 208 for any given apartment will initiate the visual and audible signals 209 and 212 so that help may be dispatched. The system of FIGS. 4 and 5 represents a simple and inexpensive method of applying the invention to multiple dwellings, taking advantage of the central location of a number of housing units.

Figure 6:
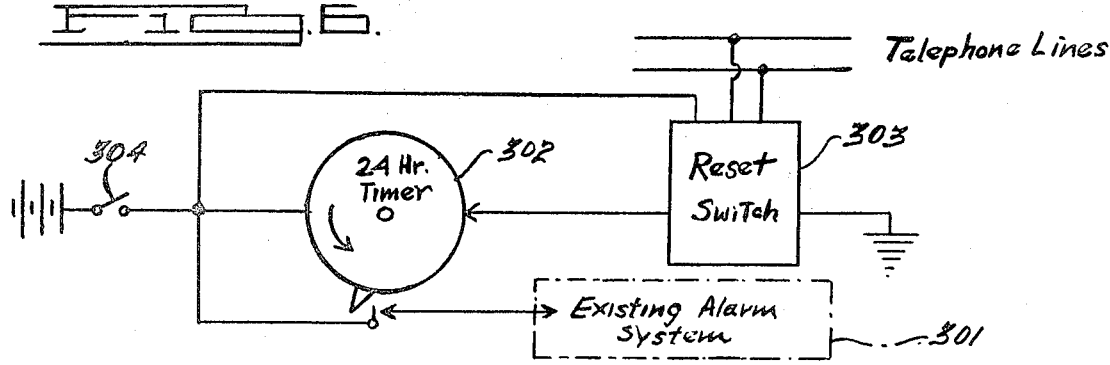
FIG. 6 is a schematic diagram of another embodiment of the invention in which the system is incorporated with an already existing alarm system in a dwelling.

FIG. 6 shows still another embodiment of the invention which is basically similar to that of FIGS. 4 and 5 but utilizes an existing alarm system 301 in a dwelling. Many housing units for the elderly or disabled have permanently installed alarm systems with pull cords or panic buttons at various places in the apartment which activate bells or lights either in the bells or at a central station. In other cases, burglar or fire alarms already exist in single or multiple dwellings. This embodiment of the invention contemplates the addition of a timer 302, "off-hook" responsive and reset which means 303, on-off switch 304, and other components of the basic system of this invention, as described with respect to FIGS. 1 to 3, to the existing alarm system.

In operation of the system shown in FIG. 6, the resident will close switch 304 to activate timer 302. If the resident uses his telephone within the timed period, or lifts the handset, the timer will be reset by switch means 303. However, if the telephone is not used during the time period, the timer will run through its cycle and activate the audible warning signal, and if not aborted, the existing alarm system 301.

An advantage of the system of FIG. 6 is that it greatly enhances the capability of existing alarm systems in residences in an extremely simple and inexpensive manner.

I claim:

1. A plurality of automatic alarm systems for use in conjunction with existing residential telephones, each telephone being located in one dwelling unit of a multiple dwelling, each automatic alarm system comprising a power source, a timer, a selectively operable switch between said power source and timer for placing the timer in a running or non-running condition, alarm means for transmitting a remote signal that help is needed at the dwelling unit, means responsive to the running of said timer for a predetermined time for activating said alarm means, reset means activatable to reset said running timer to zero and to deactivate said alarm means, and means responsive to activation of said telephone by a resident for activating at least said running timer reset means, the timer, reset means, means responsive to telephone activation and at least portions of said alarm means for all of said systems, being located at a central area of said multiple dwelling.

* * * * *